United States Patent
Xu et al.

(10) Patent No.: US 12,422,555 B2
(45) Date of Patent: Sep. 23, 2025

(54) METHOD AND APPARATUS FOR POSITIONING MOVABLE DEVICE, AND MOVABLE DEVICE

(71) Applicant: Beijing Tusen Weilai Technology Co., Ltd., Beijing (CN)

(72) Inventors: Yong Xu, Beijing (CN); Nan Wu, Beijing (CN)

(73) Assignee: Beijing Tusen Weilai Technology Co., Ltd., Beijing (CN)

( * ) Notice: Subject to any disclaimer, the term of this patent is extended or adjusted under 35 U.S.C. 154(b) by 1072 days.

(21) Appl. No.: 17/386,335

(22) Filed: Jul. 27, 2021

(65) Prior Publication Data
US 2022/0035036 A1  Feb. 3, 2022

(30) Foreign Application Priority Data
Jul. 29, 2020 (CN) .......................... 202010744252.0

(51) Int. Cl.
*G01S 17/89* (2020.01)
*G01C 21/20* (2006.01)
(Continued)

(52) U.S. Cl.
CPC .............. *G01S 17/89* (2013.01); *G01C 21/20* (2013.01); *G01S 17/42* (2013.01); *G01S 17/86* (2020.01);
(Continued)

(58) Field of Classification Search
CPC .......... G01S 17/89; G01S 17/42; G01S 17/86; G01S 17/06; G01S 7/4808;
(Continued)

(56) References Cited

U.S. PATENT DOCUMENTS 11,717,024 B2 * 8/2023 Novak, III ........... A24D 3/0216
493/39
2016/0333691 A1 * 11/2016 Puura ................... G05D 1/0251
(Continued)

FOREIGN PATENT DOCUMENTS

CN    108230379 A    6/2018
CN    110618434 A    12/2019
(Continued)

OTHER PUBLICATIONS

Roussos, Fragkiskos. European Application No. 21187971.3, Extended European Search Report Mailed Jan. 4, 2022, pp. 1-11.
(Continued)

*Primary Examiner* — Sohana Tanju Khayer
(74) *Attorney, Agent, or Firm* — Perkins Coie LLP

(57) ABSTRACT

The present disclosure relates to autonomous driving technology, and provides a method and an apparatus for positioning a movable device, as well as a movable device. The method includes: obtaining point cloud data for a predetermined area above the movable device; extracting, from the point cloud data, a first type of point cloud and a second type of point cloud on a left side and a right side of the movable device, respectively; matching the first type of point cloud and the second type of point cloud to obtain a transform matrix; and determining pose information of the movable device based on the transform matrix. With the above process, the present disclosure can solve the problem in the related art associated with accurate positioning of a movable device when GNSS signals are affected and it is difficult to accurately obtain point cloud data in front of the movable device.

20 Claims, 12 Drawing Sheets

(51) Int. Cl.
*G01S 17/06* (2006.01)
*G01S 17/42* (2006.01)
*G01S 17/86* (2020.01)
*G06F 18/2134* (2023.01)
*G06F 18/22* (2023.01)
*G06V 20/56* (2022.01)

(52) U.S. Cl.
CPC ........ *G06F 18/21345* (2023.01); *G06F 18/22* (2023.01); *G06V 20/588* (2022.01); *G01S 17/06* (2013.01)

(58) Field of Classification Search
CPC ........... G01S 2013/9318; G01S 13/931; G01S 17/931; G01S 13/86; G01S 13/874; G01S 19/48; G01C 21/20; G06F 18/21345; G06F 18/22; G06V 20/588; G06V 20/653
See application file for complete search history.

(56) References Cited

U.S. PATENT DOCUMENTS

| | | | | |
|---|---|---|---|---|
| 2017/0299404 | A1* | 10/2017 | Wang | G01S 7/4972 |
| 2020/0109954 | A1* | 4/2020 | Li | G01C 21/3848 |
| 2020/0149885 | A1* | 5/2020 | Kamei | G01B 11/245 |
| 2020/0225673 | A1 | 7/2020 | Ebrahimi Afrouzi et al. | |
| 2020/0233085 | A1* | 7/2020 | Zhang | H04W 4/023 |
| 2021/0323572 | A1* | 10/2021 | He | G06T 3/14 |
| 2021/0396842 | A1* | 12/2021 | Li | G01S 13/885 |
| 2022/0026215 | A1* | 1/2022 | Vainio | G01C 22/00 |
| 2022/0035036 | A1* | 2/2022 | Xu | G01S 17/89 |
| 2022/0057517 | A1* | 2/2022 | Huang | G01S 17/931 |
| 2022/0198706 | A1* | 6/2022 | Su | G01C 21/3602 |
| 2023/0059996 | A1* | 2/2023 | Makela | E21F 13/00 |
| 2023/0252674 | A1* | 8/2023 | Kong | G06T 7/74 382/103 |
| 2023/0376040 | A1* | 11/2023 | Puura | G05D 1/0274 |

FOREIGN PATENT DOCUMENTS

| | | |
|---|---|---|
| CN | 110673115 A | 1/2020 |
| WO | 2020114466 A1 | 6/2020 |

OTHER PUBLICATIONS

Ozaslan, Tolga et al. "Towards fully autonomous visual inspection of dark featureless dam penstocks using MAVs", IEEE/RSJ International Conference on Intelligent Robots and Systems (IROS), IEEE, Oct. 9, 2016, pp. 4998-5005.

Li, Menggang et al. "Efficient Laser-Based 3D Slam for Coal Mine Rescue Robots", IEEE Access, vol. 7, Dec. 24, 2018, p. 14124-14138.

Zhang, Shaojiang et al. "Lidar-IMU and Wheel Odometer Based Autonomous Vehicle Localization System", Chinese Control and Decision Conference (CCDC), IEEE Jun. 3, 2019, pp. 4950-4955.

Magnusson, Martin et al. "Scan registration for autonomous mining vehicles using 3D-NDT", Journal of Field Robotics, vol. 24, No. 10, Jan. 1, 2007, pp. 803-827.

Chinese Patent Office, Notice for the First Trial for CN Appl. No. 202010744252.0, mailed on Aug. 29, 2024, 34 pages with English translation.

Qinshan W. et al., "Point cloud registration algorithm based on NDT and ICP," Computer engineering and applications computer engineering and application, China Academic Journal Electronic Publishing House, 2020, 56 (7), pp. 88-95.

Notice from corresponding related Chinese Patent Application No. 202010744252.0, dated Mar. 3, 2025.

* cited by examiner

METHOD AND APPARATUS FOR POSITIONING MOVABLE DEVICE, AND MOVABLE DEVICE

CROSS-REFERENCE TO RELATED APPLICATIONS

The present disclosure claims priority to Chinese Patent Application No. 202010744252.0, titled "METHOD AND APPARATUS FOR POSITIONING MOVABLE DEVICE, AND MOVABLE DEVICE", filed on Jul. 29, 2020, the content of which is incorporated herein by reference in its entirety.

TECHNICAL FIELD

The present disclosure relates to autonomous driving technology, and more particularly, to a method and an apparatus for positioning a movable device, as well as a movable device.

BACKGROUND

This section is intended to provide a background or context for the embodiments of the present disclosure in the claims. The description here is not admitted to be prior art by mere inclusion in this section.

Movable devices refer to devices that can move on predetermined paths, such as vehicles, drones, and intelligent robots. In the field of autonomous driving technology, in order to ensure accurate operations of autonomous vehicles, unmanned aerial vehicles, intelligent robots, etc., it is generally required to accurately position these movable devices. There are many schemes for positioning at present. For example, Global Navigation Satellite System (GNSS) sensors, machine vision sensors (e.g., cameras, lidar, millimeter wave radars, ultrasonic radars, etc.) mounted on movable devices can be used for positioning. Alternatively, positioning can be performed by communication with external base stations.

Generally, in areas with relatively good satellite signals, GNSS sensors can typically be used for positioning. However, if a movable device leaves an area with high satellite signal quality and enters an area with low satellite signal quality during automatic driving, the accuracy of GNSS positioning may be greatly reduced, and accordingly the positioning accuracy of the movable device may be significantly degraded. Thus, the positioning accuracy of the movable device cannot be guaranteed.

SUMMARY

The embodiments of the present disclosure provide a method and an apparatus for positioning a movable device, as well as a movable device, capable of solving the problem associated with accurate positioning of movable devices in areas with low satellite signal quality.

In order to achieve the above object, the following solutions are provided according to the present disclosure.

In an aspect, a method for positioning a movable device moving in a tunnel with a bilaterally symmetrical cross section is provided according to an embodiment of the present disclosure. The method includes: obtaining point cloud data for a predetermined area above the movable device; extracting, from the point cloud data, a first type of point cloud and a second type of point cloud on a left side and a right side of the movable device, respectively, in accordance with a predetermined rule; and matching the first type of point cloud and the second type of point cloud to obtain a transform matrix, and determining pose information of the movable device based on the transform matrix.

In another aspect, an apparatus for positioning a movable device moving in a tunnel with a bilaterally symmetrical cross section is provided according to an embodiment of the present disclosure. The apparatus includes: a point cloud obtaining module configured to obtain point cloud data for a predetermined area above the movable device; a point cloud extracting module configured to extract, from the point cloud data, a first type of point cloud and a second type of point cloud on a left side and a right side of the movable device, respectively, in accordance with a predetermined rule; and a point cloud matching module configured to match the first type of point cloud and the second type of point cloud to obtain a transform matrix, and determine pose information of the movable device based on the transform matrix.

In another aspect, a movable device is provided according to an embodiment of the present disclosure. The movable device includes the above apparatus for positioning the movable device. The apparatus is configured to perform the above method for positioning the movable device.

In another aspect, a server is provided according to an embodiment of the present disclosure. The server includes the above apparatus for positioning a movable device. The apparatus is configured to perform the above method for positioning the movable device.

In another aspect, a computer readable storage medium is provided according to an embodiment of the present disclosure. The computer readable storage medium has a computer program stored thereon. The program, when executed by a processor, implements the above method for positioning a movable device.

In another aspect, a computer device is provided according to an embodiment of the present disclosure. The computer device includes a memory, a processor, and a computer program stored on the memory and executable on the processor. The processor is configured to, when executing the program, perform the above method for positioning a movable device.

With the solutions according to the embodiments of the present disclosure, point cloud data for a predetermined area above a movable device is obtained. A first type of point cloud and a second type of point cloud on a left side and a right side of the movable device, respectively, are extracted from the point cloud data in accordance with a predetermined rule. The first type of point cloud and the second type of point cloud are matched to obtain a transform matrix, and pose information of the movable device is determined based on the transform matrix. With the above process, the solutions of the present disclosure can solve the problem in the related art associated with accurate positioning of a movable device when GNSS signals are affected and it is difficult to accurately obtain point cloud data in front of the movable device. Meanwhile, since the point cloud data above the movable device is collected, the solution will not be affected in use by temporary obstacles.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

Figure 1:
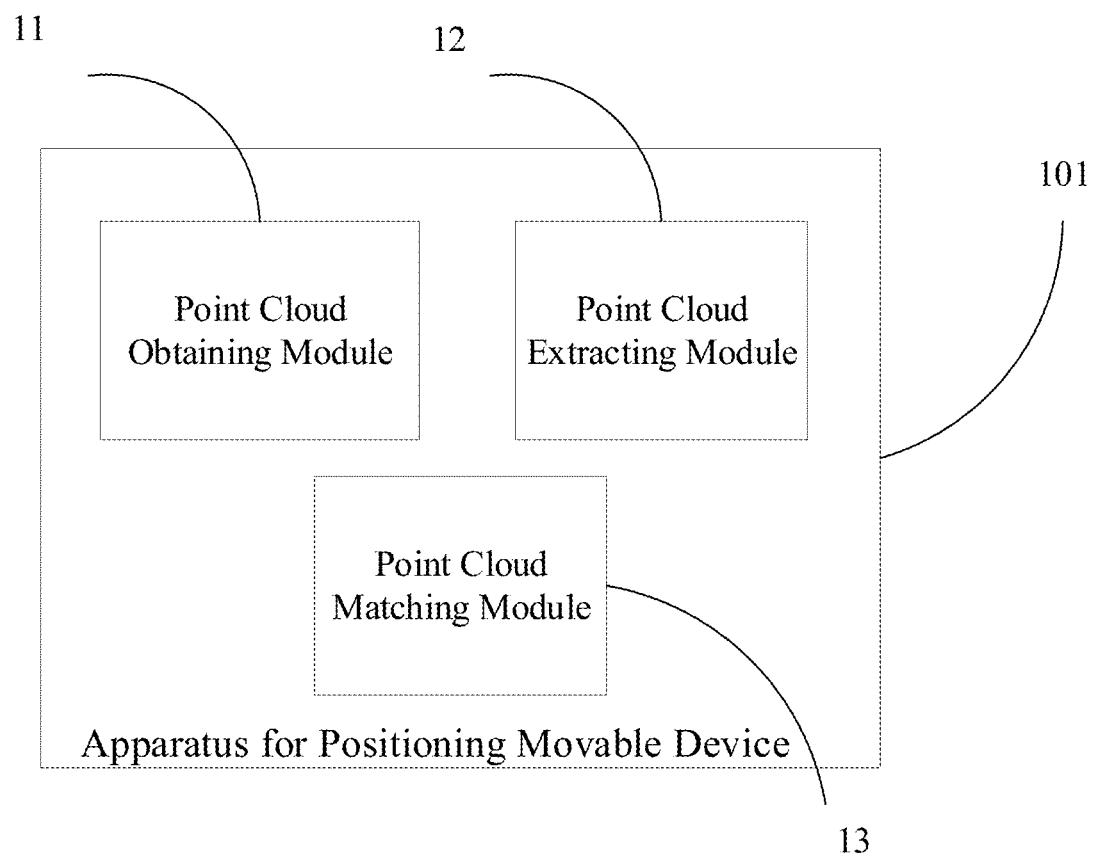
FIG. 1 is a schematic diagram showing a structure of an apparatus for positioning a movable device according to an embodiment of the present disclosure.

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

It is to be noted that the term "movable device" is to be broadly interpreted in the present disclosure as including any moving objects, including for example aircraft, ships, spacecrafts, cars, trucks, vans, semi-trailers, motorcycles, golf carts, off-road vehicles, warehouse transport vehicles, agricultural vehicles, and movable devices running on tracks, such as trams or trains and other rail vehicles. A "movable device" as used in the present disclosure may typically include: a power system, a sensor system, a control system, peripheral devices and a computer system. In other embodiments, a movable device may include more, fewer, or different systems.

Based on the movable device described above, for example, an autonomous vehicle can be further provided with a sensor system and an autonomous driving control device.

The sensor system may include a plurality of sensors for sensing information on an environment in which the movable device is located, and one or more actuators that change at least one of the positions and directions of the sensors. The sensor system may include any combination of sensors such as a Global Positioning System (GPS) sensor, an Inertial Measurement Unit (IMU), a Radio Detection and Ranging (RADAR) unit, a camera, a laser rangefinder, a Light Detection and Ranging (LIDAR) unit, and an acoustic sensor. The sensor system may further include sensors that monitor the movable device's internal systems (such as an $O_2$ monitor, a fuel gauge, an engine thermometer, etc.).

The autonomous driving control device may include a processor and a memory having at least one machine executable instruction stored therein. The processor executes the at least one machine executable instruction to provide functions including e.g., a map engine, a positioning module, a perception module, a navigation or route module, and an autonomous control module. The map engine and the positioning module are configured to provide map information and positioning information. The perception module is configured to perceive objects in the environment around the movable device based on information obtained by the sensor system and the map information provided by the map engine. The navigation or route module is configured to plan a driving route for the movable device based on processing results from the map engine, the positioning module and the perception module. The autonomous control module is configured to convert decision information inputted from the modules such as the navigation or route module into a control command for outputting to a movable device control system, and transmit the control command to respective components in the movable device control system over an in-vehicle network (for example, an internal electronic network system in the movable device, implemented using a CAN bus, a local interconnection network, a multimedia directional system transmission, etc.) for autonomous control of the movable device. The autonomous control module can also obtain information on respective components in the movable device via the in-vehicle network.

In order to allow those skilled in the art to better understand the present disclosure, the technical terms used in the embodiments of the present disclosure are explained as follows:

GPS: Global Positioning System.
GNSS: Global Navigation Satellite System.
IMU: Inertial Measurement Unit.
ICP: Iterative Closest Point, a cloud point matching algorithm.
NDT: Normal Distributions Transform, a cloud point matching algorithm.
UWB: Ultra-Wideband, a wireless carrier communication technology.
Pose: a generic term for position and posture, having 6 degrees of freedom, including 3 degrees of freedom for position and 3 degrees of freedom for orientation. The three degrees of freedom for orientation are usually represented by pitch, roll, and yaw. In the present disclosure, since a movable device typically moves on a horizontal road surface, only the yaw is considered.

In order to allow those skilled in the art to better understand the present disclosure, the application environment involved in the present disclosure will be described below.

For example, the present disclosure can be applied to positioning of autonomous vehicles in semi-closed environments such as tunnels and underground garages. These are only some application examples in the present disclosure. It is to be noted that, given the teaching of the embodiments of the present disclosure, those skilled in the art can also provide more application examples as desired, and the present disclosure is not limited to these application examples.

In the process of implementing the embodiments of the present disclosure, the inventor(s) found that in scenarios such as tunnels where GNSS signals are affected, typically various types of data, such as inertial navigation data, lidar data, and high-precision map data, can be fused for positioning. However, the high-precision map does not include information on other temporary obstacles such as social vehicles, pedestrians, and non-motorized vehicles, but a point cloud collected by a movable device in real time contains point clouds for these temporary obstacles, which are difficult to be filtered. In addition, in case of a high traffic volume, when an autonomous vehicle is close to vehicles in front, images and point clouds for valid signs on a road ahead cannot be obtained due to a problem that sensors are blocked (e.g., images and point clouds for lane lines on the road cannot be obtained), such that a sensor-based positioning algorithm does not work, resulting in failure of positioning of the autonomous vehicle.

In view of the above problems, the embodiments of the present disclosure provide a solution for positioning a movable device. In this solution, an apparatus for positioning a movable device can obtain point cloud data for a certain area above the movable device, extract, from the point cloud data, point clouds on a left side and a right side of the movable device, respectively, in accordance with a predetermined rule, and further match the two types of point clouds to obtain a transform matrix, and determine pose information of the movable device based on the transform matrix. Therefore, the solutions of the present disclosure can solve the problem in the related art associated with accurate positioning of a movable device when GNSS signals are affected and it is difficult to accurately obtain point cloud data in front of the movable device. Meanwhile, since the point cloud data above the movable device is collected, the solution will not be affected in use by temporary obstacles, and there is no need to build a high-precision map in advance.

Some embodiments of the present disclosure provide a solution for positioning a movable device. In order to provide a reliable scheme for positioning a movable device, in one embodiment, as shown in FIG. 1, an apparatus for positioning a movable device is provided. The movable device moves in a tunnel with a bilaterally symmetrical cross section. The apparatus includes:
  a point cloud obtaining module 11 configured to obtain point cloud data for a predetermined area above the movable device;
  a point cloud extracting module 12 configured to extract, from the point cloud data, a first type of point cloud and a second type of point cloud on a left side and a right side of the movable device, respectively, in accordance with a predetermined rule; and
  a point cloud matching module 13 configured to match the first type of point cloud and the second type of point cloud to obtain a transform matrix, and determine pose information of the movable device based on the transform matrix.

Figure 2A:
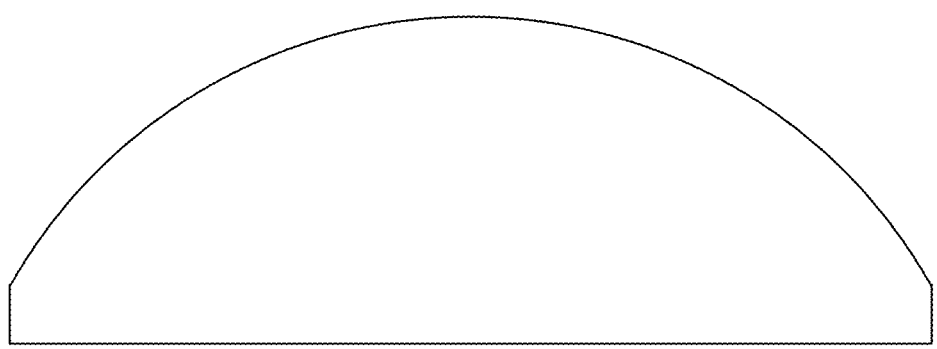
FIGS. 2a-2c are schematic diagrams each showing a cross-section of a tunnel according to an embodiment of the present disclosure.
Figure 2B:
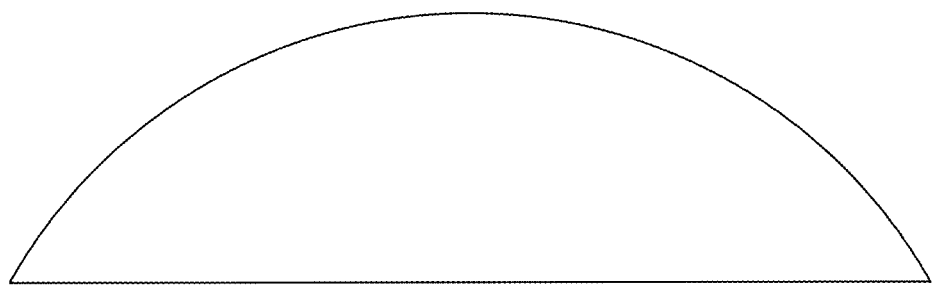
Figure 2C:
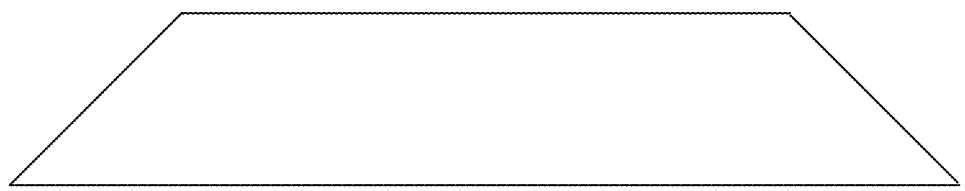

In a specific implementation, the solution according to the present disclosure is not limited to any specific shape of the tunnel, as long as the tunnel has a bilaterally symmetrical cross section. FIGS. 2a~2c show several types of tunnel cross-sections, but it is to be noted that the present disclosure is not limited to any of these examples.

Figure 3:
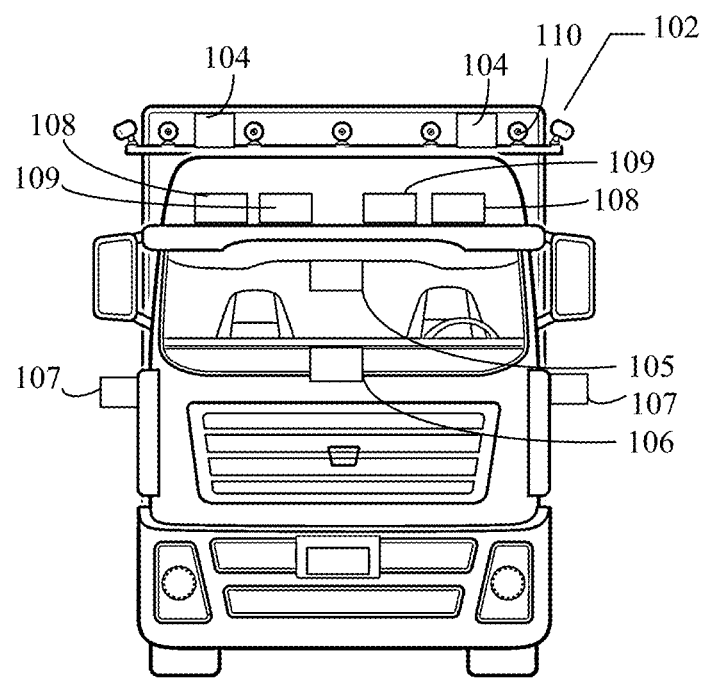
FIG. 3 is a schematic diagram showing a structure of a movable device according to an embodiment of the present disclosure.

In an embodiment, as shown in FIG. 3, an embodiment of the present disclosure further provides a movable device 102, which may be a device that moves in a tunnel, such as an autonomous vehicle or an intelligent robot. The movable device 102 may include an apparatus 101 for positioning the movable device. In addition, a variety of sensors can be provided on the movable device 102. For example, the sensors may include any combination of a GNSS sensor 104, a UWB tag 105, an IMU sensor 106, a lidar sensor 107, a millimeter wave radar sensor 108, an ultrasonic radar sensor 109, a camera 110, etc. For the purpose of illustration herein, the movable device 102 may be provided with each of the above sensors. The apparatus 101 for positioning the movable device may be a vehicle-mounted server or a vehicle-mounted computer on the movable device 102, and the present disclosure is not limited to any of these examples.

Figure 4:
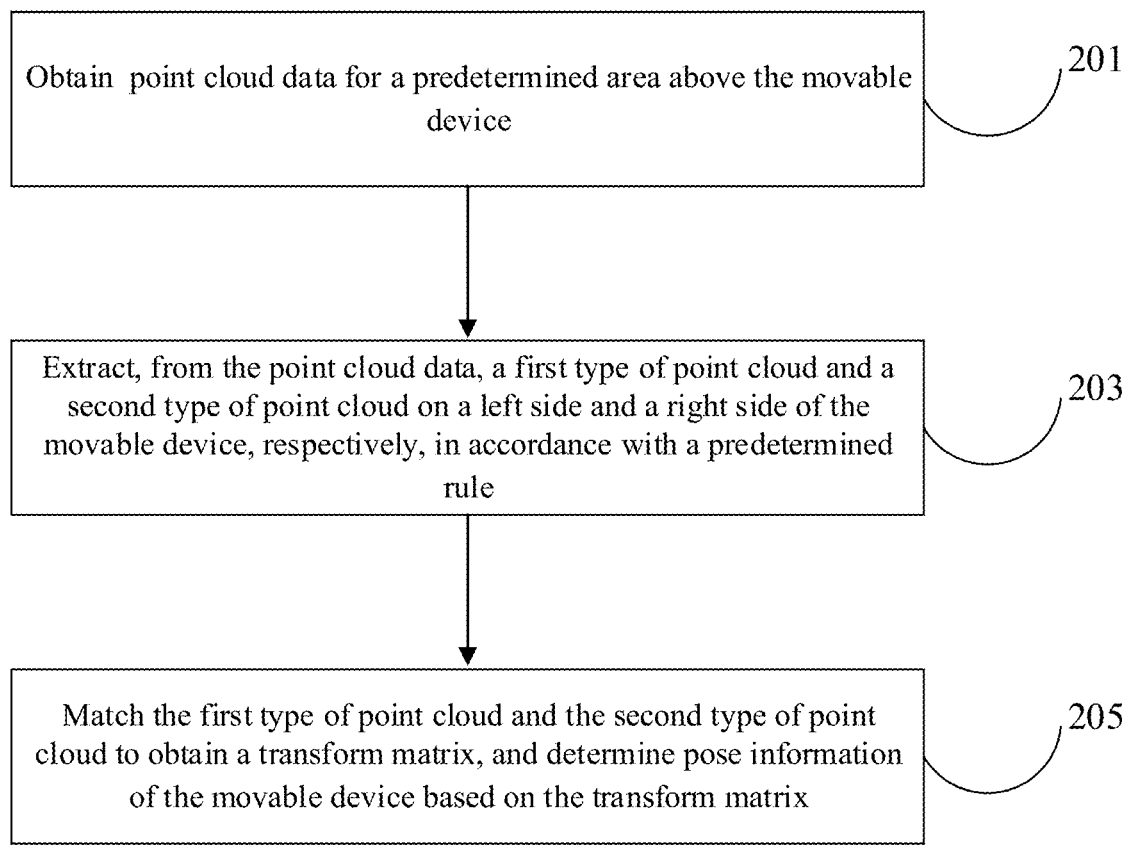
FIG. 4 is a flowchart illustrating a method for positioning a movable device according to an embodiment of the present disclosure.

In an embodiment, as shown in FIG. 4, a positioning apparatus of the present disclosure can provide a method for positioning a movable device for the above movable device. The movable device moves in a tunnel with a bilaterally symmetrical cross section. The method includes the following steps.

At step 201, point cloud data for a predetermined area above the movable device is obtained.

At step 203, a first type of point cloud and a second type of point cloud on a left side and a right side of the movable device are extracted from the point cloud data, respectively, in accordance with a predetermined rule.

At step 205, the first type of point cloud and the second type of point cloud are matched to obtain a transform matrix, and pose information of the movable device is determined based on the transform matrix.

Figure 5:
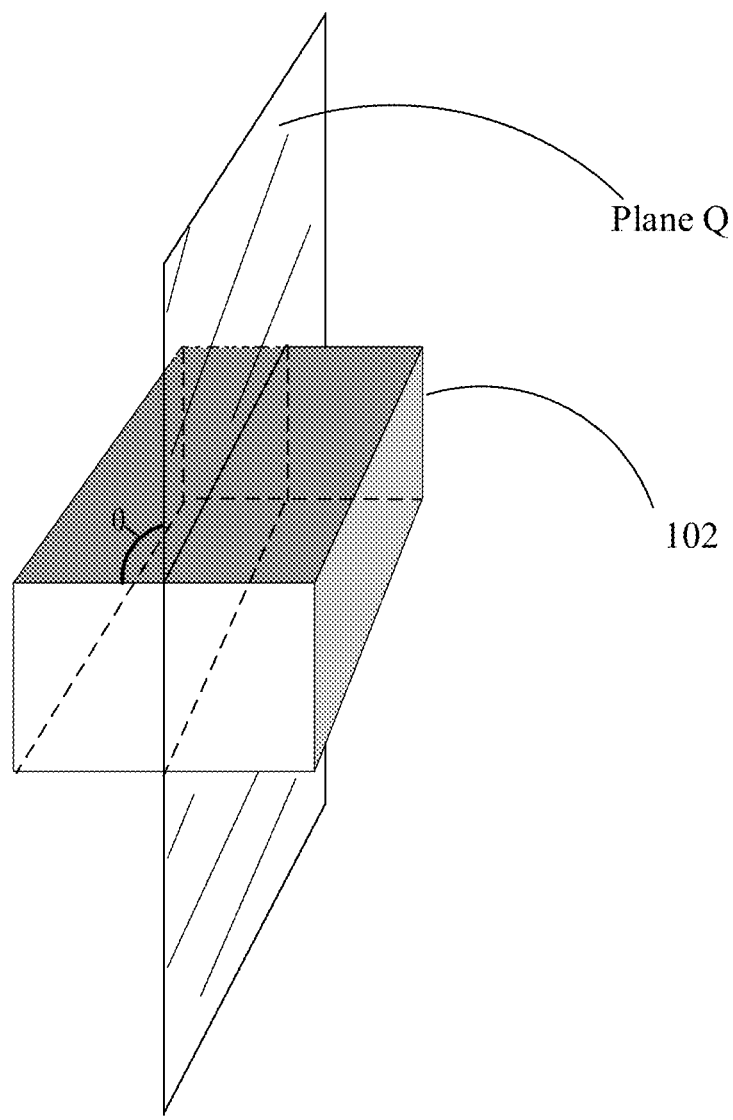
FIG. 5 is a schematic diagram showing a scanning plane of a lidar and a movable device according to an embodiment of the present disclosure.

In one embodiment, FIG. 5 is a schematic diagram showing intersection of a scanning plane formed by a lidar mounted on the movable device in operation and the movable device. In a specific implementation, the lidar can be provided on the movable device 102, and its scanning plane may form a certain angle θ with a movement plane of the movable device, such that the lidar can detect the tunnel above in operation to obtain the point cloud data for the tunnel above. Here, θ is preferably a 90-degree angle. The present disclosure is not limited to any specific way in which the lidar is mounted.

Figure 6A:
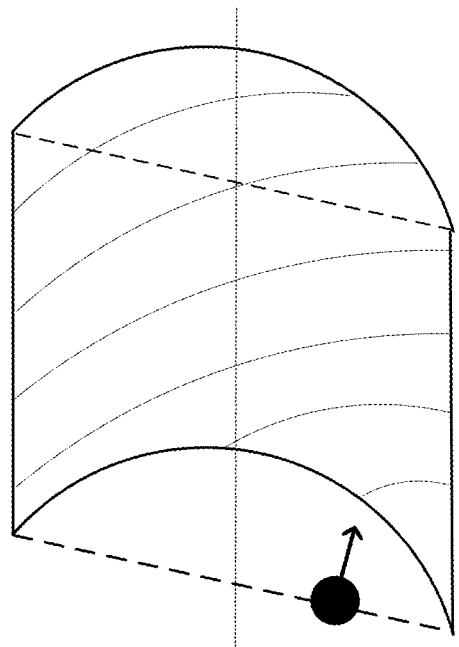
FIGS. 6a-6c are schematic diagrams each showing a point cloud sample above the movable device according to an embodiment of the present disclosure.
Figure 6B:
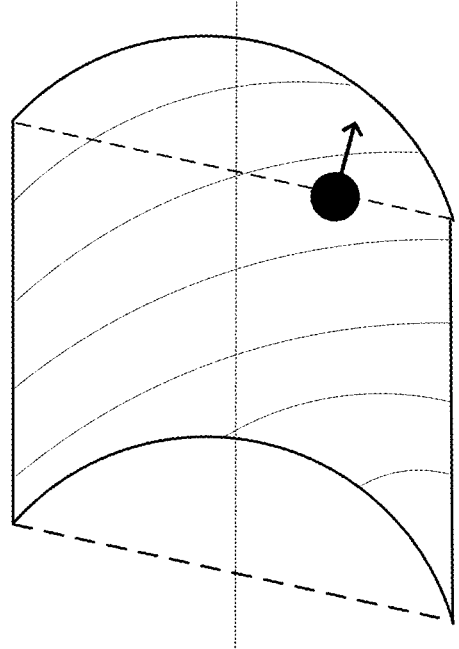
Figure 6C:
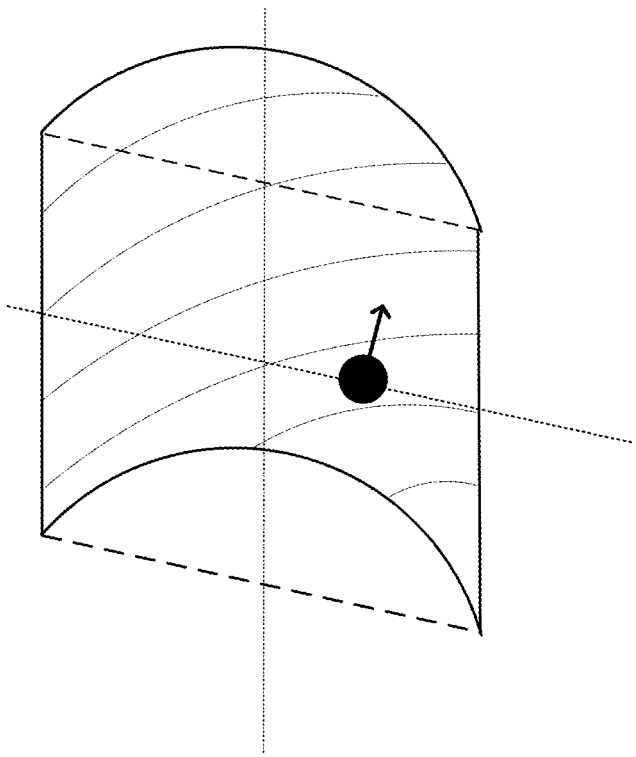

In one embodiment, the step 201 of obtaining the point cloud data for the predetermined area above the movable device may include obtaining point cloud data of a predetermined area at a top of the tunnel above the movable device using the lidar Further, in a specific scenario, with a selected reference point of the movable device, the point cloud sampling area may be an area having a predetermined distance in front of the reference point in the tunnel (as shown in FIG. 6a), an area having a predetermined distance behind the reference point in the tunnel (as shown in FIG. 6b), or an area having a predetermined distance in front of and behind the reference point in the tunnel (as shown in FIG. 6c), so as to obtain the point cloud data of the sampling area. In one embodiment, the front and behind of the reference point refer to the front and behind of the vertical section of the vehicle where the reference point is located, and the vertical section is parallel to the XZ-axis plane.

Figure 7:
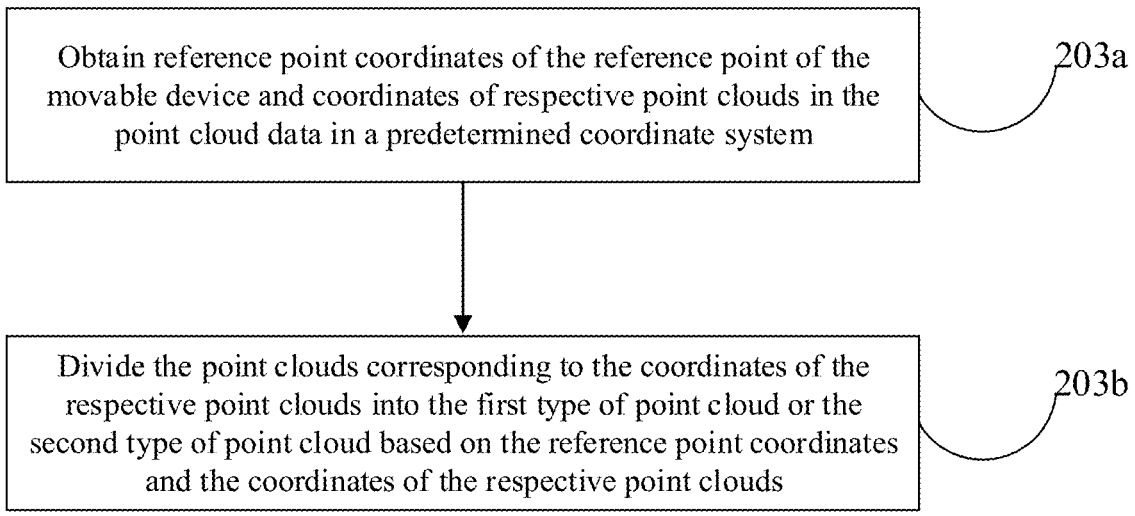
FIG. 7 is a flowchart illustrating a method for dividing point clouds above a movable device according to an embodiment of the present disclosure.

In one embodiment, as shown in FIG. 7, the above step 203 of extracting, from the point cloud data, the first type of point cloud and the second type of point cloud on the left side and the right side of the movable device, respectively, in accordance with the predetermined rule may include:

at step 203a, obtaining reference point coordinates of the reference point of the movable device and coordinates of respective point clouds in the point cloud data in a predetermined coordinate system; and at step 203b, dividing the point clouds corresponding to the coordinates of the respective point clouds into the first type of point cloud or the second type of point cloud based on the reference point coordinates and the coordinates of the respective point clouds.

For example, in an embodiment of the present disclosure, an IMU coordinate system of the movable device can be used as the predetermined coordinate system. Here, the predetermined coordinate system includes an X-axis, a Y-axis, and a Z-axis, where the X-axis is a lateral direction of the movable device (e.g., for a vehicle, the X-axis points to a rightward direction of the vehicle), the Y-axis is a longitudinal direction of the movable device (e.g., for a vehicle, the Y-axis points to a forward direction of the vehicle), and the-Z axis is perpendicular to a plane where the X-axis and the Y-axis are located (e.g., for a vehicle, the Z-axis points to an upward direction of the vehicle). Then the reference point coordinates (0, 0, 0) of the reference point of the movable device and the coordinates of the respective point clouds in the point cloud data in the predetermined coordinate system can be obtained. The point clouds corresponding to the coordinates of the respective point clouds can be divided into the first type of point cloud or the second type of point cloud based on the reference point coordinates and the coordinates of the respective point clouds. Further, for example, the point clouds with coordinates satisfying x≥0 may be determined as the first type of point cloud, and the point clouds with coordinates satisfying x<0 may be determined as the second type of point cloud. It is to be noted that the use of the IMU coordinate system as the predetermined coordinate system here and hereinafter is only an implementation of the present disclosure and is described here for the purpose of illustration only. The present disclosure is not limited to this example.

Figure 8:
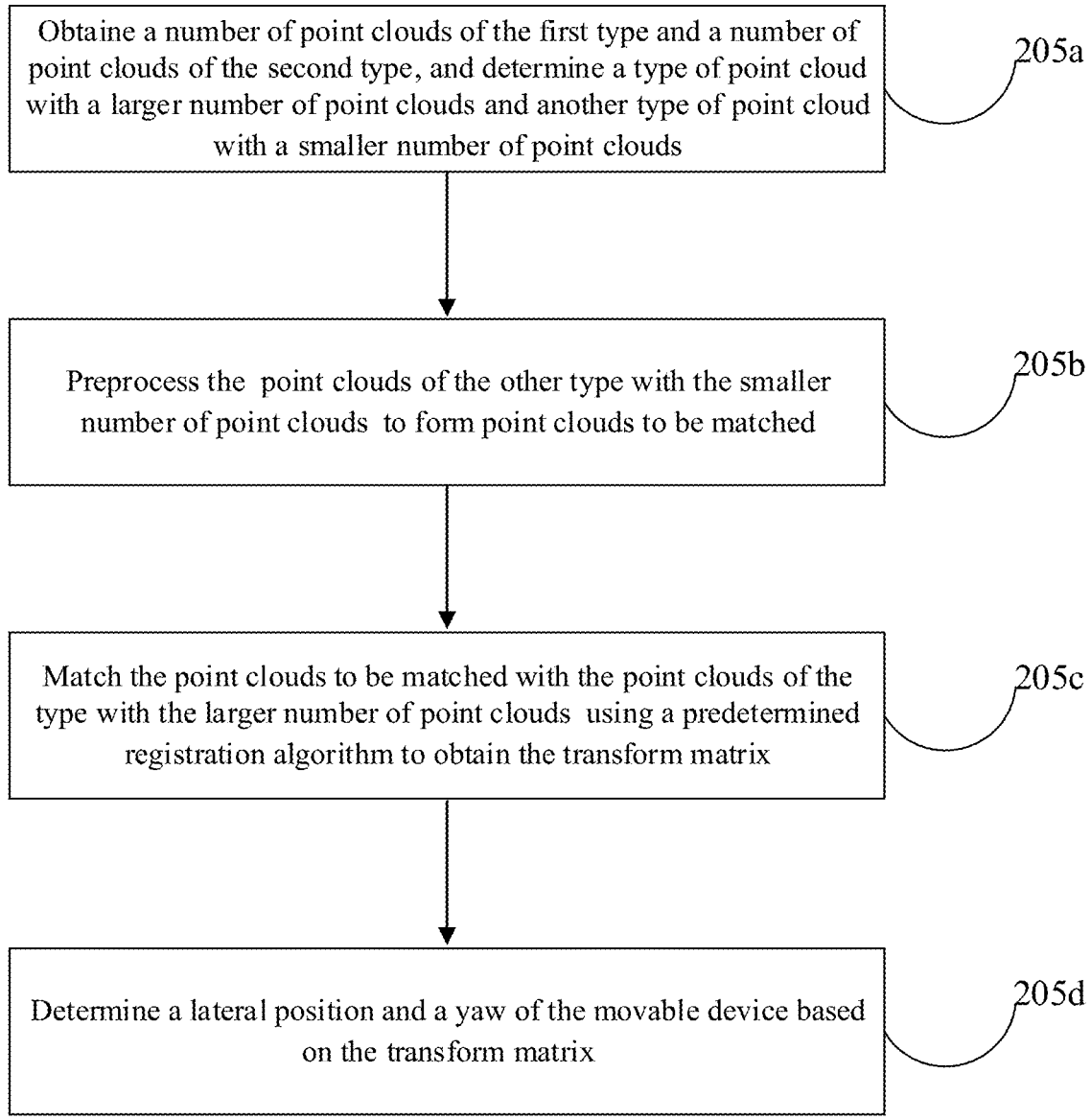
FIG. 8 is a flowchart illustrating a method for matching point clouds according to an embodiment of the present disclosure.

In one embodiment, as shown in FIG. 8, the above step 205 of matching the first type of point cloud and the second type of point cloud to obtain the transform matrix and determining the pose information of the movable device based on the transform matrix may include:

at step 205a, obtaining a number of point clouds of the first type and a number of point clouds of the second type, and determining a type of point cloud with a larger number of point clouds and another type of point cloud with a smaller number of point clouds;

at step 205b, preprocessing the point clouds of the other type with the smaller number of point clouds to form point clouds to be matched;

at step 205c, matching the point clouds to be matched with point clouds of the type with the larger number of point clouds using a predetermined registration algorithm to obtain the transform matrix; and at step 205d, determining a lateral position and a yaw of the movable device based on the transform matrix.

For example, after dividing the point clouds based on the reference point coordinates and the coordinates of the point clouds, the number of point clouds of the first type and the number of point clouds of the second type can be further determined. Assuming that the number of point clouds of the first type is smaller, the point clouds of the first type can be preprocessed and matched with the point clouds of the second type with the larger number of point clouds, to obtain the transform matrix, from which the pose information of the movable device can be determined. The pose information may include the lateral position (or lateral displacement) of the movable device relative to a central axis on a ground of the tunnel and the yaw of the movable device.

In an embodiment, in the step 205a, the number of point clouds of the first type and the number of point clouds of the second type of point cloud can be obtained by using any of various open-source or non-open-source commercial software to count the point clouds, or by using a specially developed module for counting the point clouds, and the present disclosure is not limited to any of these examples.

In one embodiment, the step 205b of preprocessing the point clouds of the other type with the smaller number of point clouds to form the point clouds to be matched may include: forming the point clouds to be matched by rotating the point clouds of the other type with the smaller number of point clouds around a Z-axis of the predetermined coordinate system by 180 degrees. The predetermined coordinate system includes an X-axis, a Y-axis, and the Z-axis, where the X-axis is a lateral direction of the movable device (e.g., for a vehicle, the X-axis points to a rightward direction of the vehicle), the Y-axis is a longitudinal direction of the movable device (e.g., for a vehicle, the X-axis points to a forward direction of the vehicle), and the Z-axis is perpendicular to a plane where the X-axis and the Y-axis are located (e.g., for a vehicle, the X-axis points to an upward direction of the vehicle).

In one embodiment, the step 205c of matching the point clouds to be matched with the point clouds of the type with the larger number of point clouds using the predetermined registration algorithm to obtain the transform matrix may include: matching the point clouds to be matched, as obtained above by preprocessing, with the point clouds of the type with the larger number of point clouds using an Iterative Closest Point (ICP) algorithm or a Normal Distributions Transform (NDT) algorithm to obtain the transform matrix. The transform matrix includes a translation vector t(C, m, n), where C is a displacement in the X-axis direction in the predetermined coordinate system when the point clouds are matched, m is a displacement in the Y-axis direction in the predetermined coordinate system when the point clouds are matched, and n is a displacement in the Z-axis direction in the predetermined coordinate system when the point clouds are matched.

Figure 9:
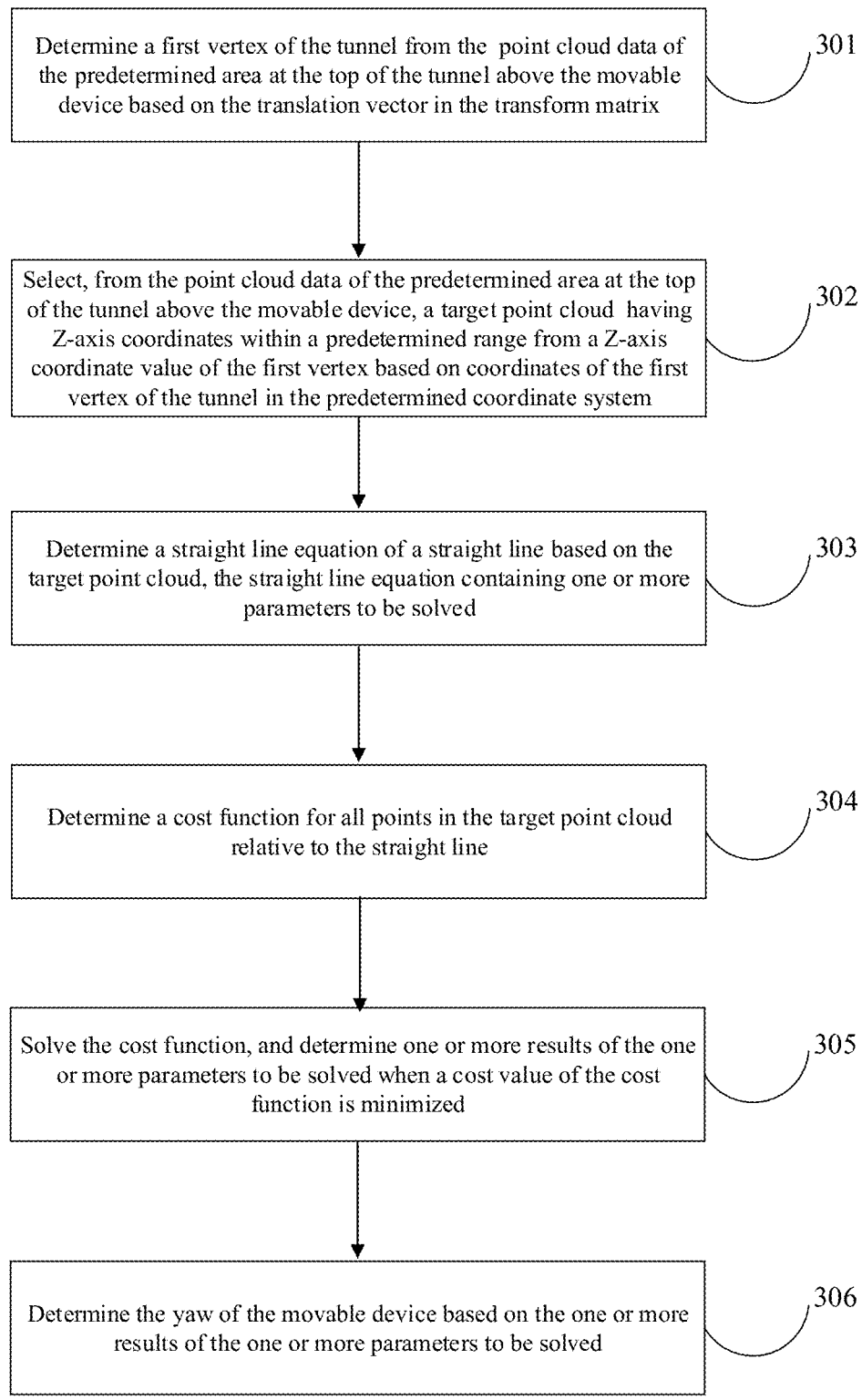
FIG. 9 is a flowchart illustrating a method for calculating a yaw according to an embodiment of the present disclosure.

In an embodiment, in the step 205d, the operation of determining the lateral position of the movable device based on the transform matrix may include: determining a lateral distance of the movable device from a center line of the tunnel as $$\frac{|C|}{2}$$

based on a translation distance |C| along the X-axis in the predetermined coordinate system when the point clouds are matched In an embodiment, as shown in FIG. 9, in the step 205d, the operation of determining the yaw of the movable device based on the transform matrix may include:

at step 301, determining a first vertex of the tunnel from the point cloud data of the predetermined area at the top of the tunnel above the movable device based on the translation vector in the transform matrix;

at step 302, selecting, from the point cloud data of the predetermined area at the top of the tunnel above the movable device, a target point cloud having Z-axis coordinates within a predetermined range from a Z-axis coordinate value of the first vertex based on coordinates of the first vertex of the tunnel in the predetermined coordinate system;

at step 303, determining a straight line equation of a straight line based on the target point cloud, the straight line equation containing one or more parameters to be solved;

at step 304, determining a cost function for all points in the target point cloud relative to the straight line;

at step 305, solving the cost function, and determining one or more results of the one or more parameters to be solved when a cost value of the cost function is minimized; and at step 306, determining the yaw of the movable device based on the one or more results of the one or more parameters to be solved.

In one embodiment, in the above step 301, the operation of determining the first vertex of the tunnel from the point cloud data of the predetermined area at the top of the tunnel above the movable device based on the translation vector in the transform matrix may include: determining the first vertex of the tunnel from the point cloud data of the predetermined area at the top of the tunnel above the movable device based on the translation distance |C| along the X-axis in the predetermined coordinate system when the point clouds are matched in the translation vector t(C, m, n). The first vertex has an X-axis coordinate of $$-\frac{|C|}{2}$$

and a Y-axis coordinate of 0 in the predetermined coordinate system, or the first vertex is a point p0 (x0, y0, z0) in the point cloud data that has a minimum distance from a point with an X-axis coordinate of $$-\frac{|C|}{2}$$

and a Y-axis coordinate of 0.

In one embodiment, in the above step 302, the operation of selecting, from the point cloud data of the predetermined area at the top of the tunnel above the movable device, the target point cloud having the Z-axis coordinate within the predetermined range from the Z-axis coordinate value of the first vertex based on the coordinates of the first vertex of the tunnel in the predetermined coordinate system may include: selecting, from the point cloud data of the predetermined area at the top of the tunnel above the movable device, the target point cloud having Z-axis coordinates within a predetermined range of (z0−d, z0+d) based on the coordinates of the first vertex of the tunnel in the predetermined coordinate system, where d is a predetermined distance threshold and z0 is the Z-axis coordinate of the first vertex.

In one embodiment, in the above step 303, the operation of determining the straight line equation of the straight line based on the target point cloud, the straight line equation containing one or more parameters to be solved, may include: determining the straight line equation as a(x−x0)+b(y−y0)=0 based on to the target point cloud, where a and b are the parameters to be solved.

In one embodiment, in the above step 304, the operation of determining the cost function for all points in the target point cloud relative to the straight line may include: determining the cost function for all points (xi, yi, zi) in the target point cloud relative to the straight line as:

$$\text{cost} = \sum \frac{(a(xi - x0) + b(yi - y0))^2}{\sqrt{a^2 + b^2}}.$$

In one embodiment, in the above step 305, the operation of solving the cost function and determining the one or more results of the one or more parameters to be solved when the cost value of the cost function is minimized may include: obtaining a minimum value optimized solution of the cost function to determine the results a0 and b0 of the parameters to be solved when the cost value of the cost function is minimized.

In an embodiment, in the above step 306, the operation of determining the yaw of the movable device based on the one or more results of the one or more parameters to be solved may include: determining the yaw of the movable device relative to the tunnel as $$\arctan\frac{b0}{a0}.$$

With the above process, in scenarios such as tunnels where GNSS signals are affected, the solution can obtain point cloud data for a certain area above the movable device, extract, from the point cloud data, point clouds on a left side and a right side of the movable device, respectively, in accordance with a predetermined rule, and further match the two types of point clouds to obtain a transform matrix, and determine pose information of the movable device based on the transform matrix. Therefore, the solutions of the present disclosure can solve the problem in the related art associated with accurate positioning of a movable device when GNSS signals are affected and it is difficult to accurately obtain point cloud data in front of the movable device. Meanwhile, since the point cloud data above the movable device is collected, the solution will not be affected in use by temporary obstacles, and there is no need to build a high-precision map in advance.

In the following, an embodiment will be described to explain how in particular a method for positioning a movable device according to the present disclosure is implemented.

Figure 10A:
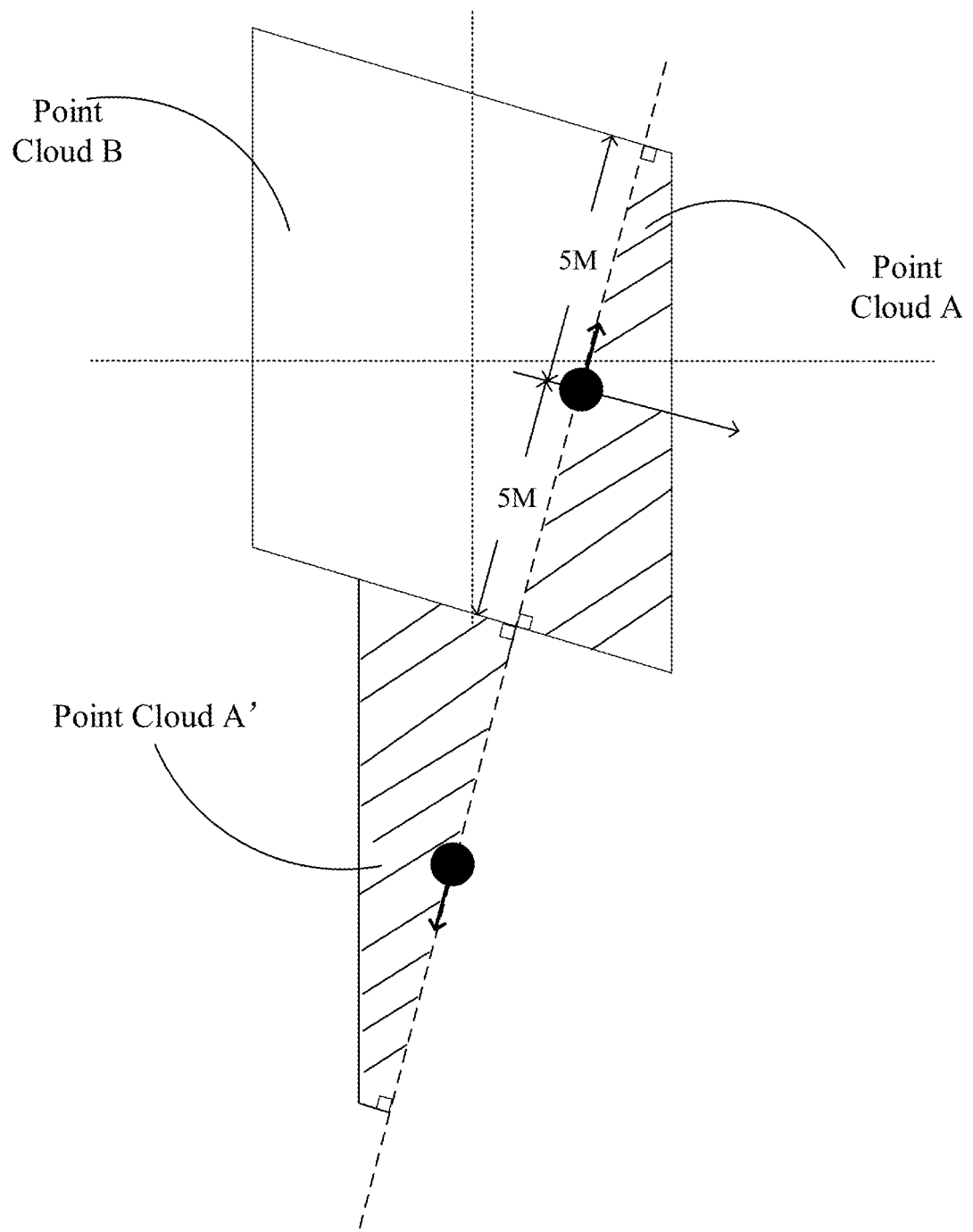
FIG. 10a is a schematic diagram showing a planar projection for preprocessing point clouds according to an embodiment of the present disclosure.

In one embodiment, a movable device (such as an autonomous vehicle) is moving in a tunnel, and an origin of an IMU coordinate system is used as a reference point for the movable device. An area within a distance of 5M in front of and behind the reference point is used as a sampling area. FIG. 10a shows a top view of the sampling area. A point cloud with a smaller number of point clouds is denoted as Point Cloud A (see the shaded portion on the right), and a point cloud with a larger number of point clouds is denoted as Point Cloud B (see the blank portion on the left). Before matching Point Cloud A and Point Cloud B, Point Cloud A needs to be first rotated around the Z-axis of the IMU coordinate system by 180 degrees to form Point Cloud A' to be matched (see the shaded portion at the bottom).

Figure 10B:
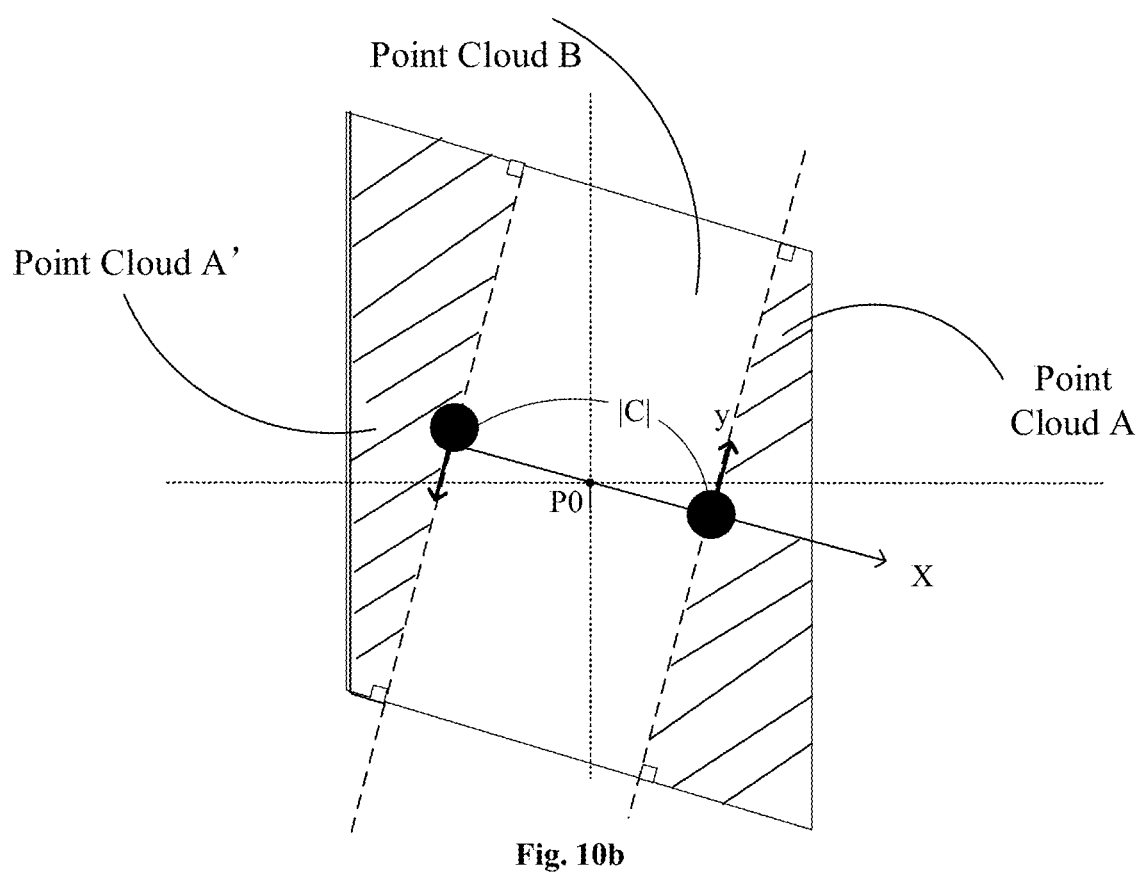
FIG. 10b is a schematic diagram showing a planar projection for matching point clouds according to an embodiment of the present disclosure.

Further, as shown in FIG. 10b, Point Cloud A' is matched with Point Cloud B using a predetermined registration algorithm to obtain a transform matrix, and a translation vector of Point Cloud A' relative to B is extracted from the transform matrix. Then, a lateral position of the movable device can be determined. In particular, when matching Point Clouds A' and B, a Iterative Closest Point (ICP) algorithm or a Normal Distributions Transform (NDT) algorithm can be used to obtain the transform matrix, which includes the translation vector t(C, m, n), where C is a displacement in the X-axis direction in the IMU coordinate system when the point clouds are matched, m is a displacement in the Y-axis direction in the IMU coordinate system when the point clouds are matched, and n is a displacement in the Z-axis direction in the IMU coordinate system when the point clouds are matched. In this case, a lateral distance between the movable device and a center line of the tunnel can be determined based on the geometric relationship as $$\frac{|C|}{2}.$$

Figure 11:
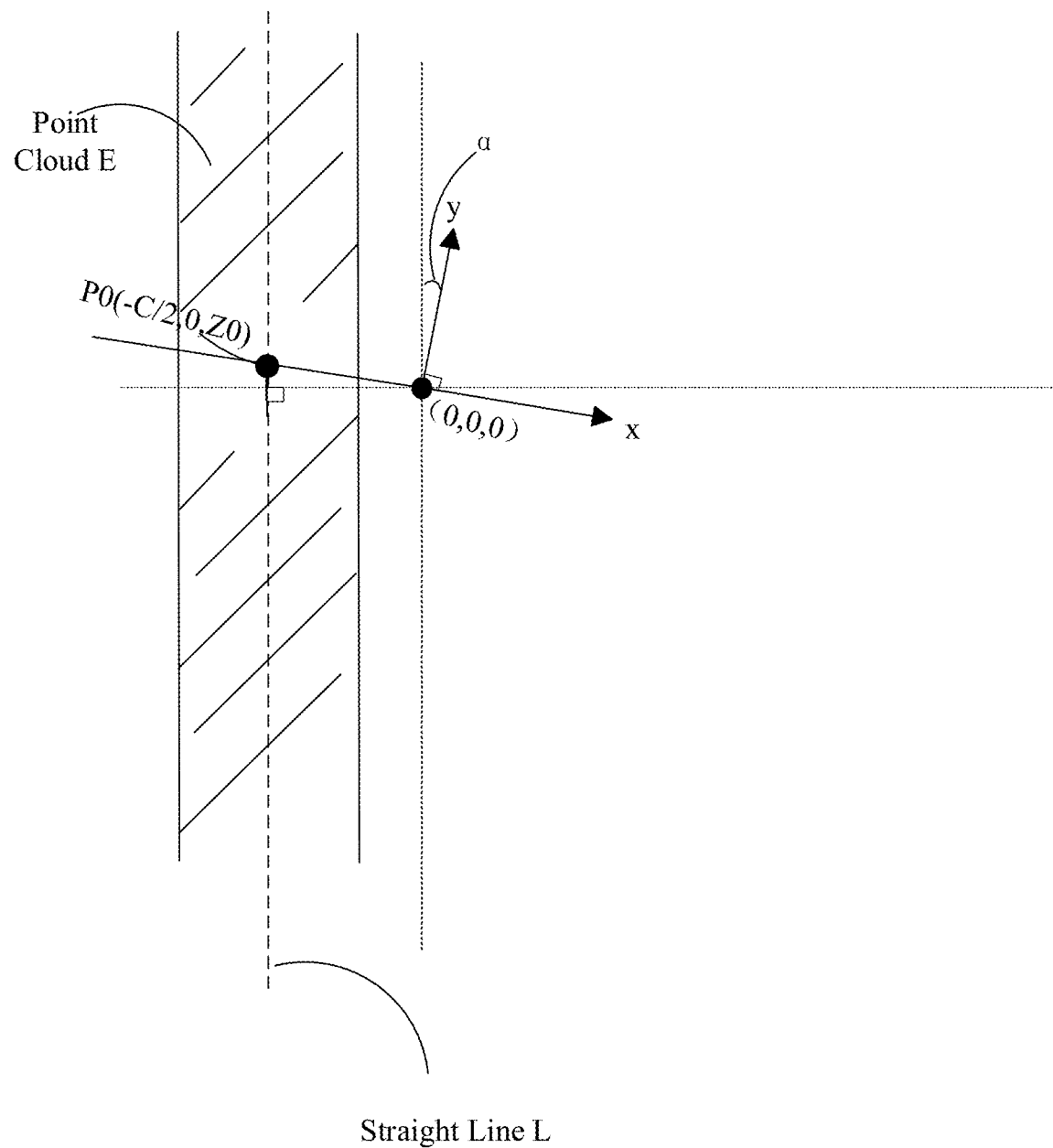
FIG. 11 is a schematic diagram showing extraction of point clouds for straight line fitting according to an embodiment of the present disclosure.

Further, based on a translation distance |C| along the X-axis in the predetermined coordinate system when the point clouds are matched, a first vertex of the tunnel is determined from the point cloud data of the predetermined area at the top of the tunnel above the movable device. Assuming that there is Point P0 at $$x = -\frac{|C|}{2}, y = 0,$$

then $$P0\left(-\frac{|C|}{2}, 0, z0\right)$$

is the first vertex of the tunnel. As shown in FIG. 11, based on the coordinates of the first vertex of the tunnel in the IMU coordinate system, a target Point Cloud E having Z-axis coordinates within a predetermined range of (z0−0.2, z0+0.2) is selected from the point cloud data of the predetermined area at the top of the tunnel above the movable device.

Figure 12:
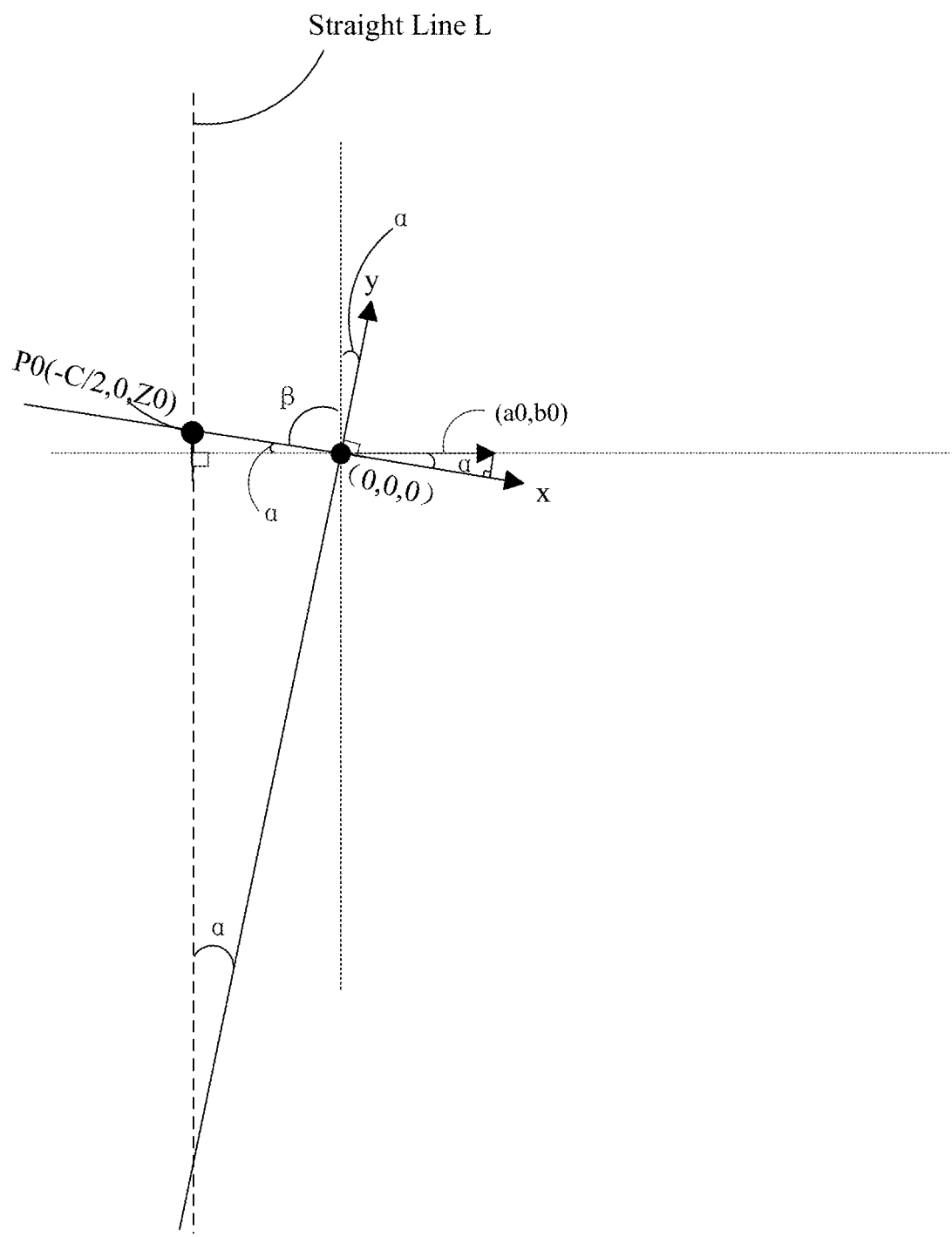
FIG. 12 is a schematic diagram showing a geometric relationship when calculating a yaw according to an embodiment of the present disclosure.

Further, as shown in FIG. 12, based on the target Point Cloud E, a straight line equation L: a(x−x0)+b(y−y0)=0 is provided, where a and b are parameters to be solved, to solve a cost function for all points (xi, yi, zi) in the target Point Cloud E relative to the straight line $$\text{cost} = \sum \frac{(a(xi - x0) + b(yi - y0))^2}{\sqrt{a^2 + b^2}}.$$

A minimum value optimized solution of the cost function is obtained to determine results a0 and b0 of the parameters to be solved when the cost value of the cost function is minimized. In this case, the straight line L should be a straight line that passes through Point $$P0\left(-\frac{|C|}{2}, 0, z0\right)$$

and has a projection best fitted to a central axis on the ground of the tunnel. The straight line L is perpendicular to a plane vector (a0, b0), then the yaw of the movable device relative to the tunnel can be derived according to the geometric relationship as $$\alpha = \arctan\frac{b0}{a0}.$$

Further, when the yaw of the tunnel itself is a0, the yaw of the movable device in a global map is $$\left(\alpha 0 + \arctan\frac{b0}{a0}\right).$$

With the above process, the method according to the embodiment of the present disclosure can effectively facilitate positioning of a movable device in scenarios such as a tunnel, so as to obtain a lateral distance and a yaw between the movable device and a central axis on the ground of the tunnel, thereby avoiding obstacles in front and accurately obtaining a relative position of the movable device without relying on high-precision maps.

In an embodiment, an embodiment of the present disclosure further provides a cloud server. The cloud server includes an apparatus for positioning a movable device. The apparatus is configured to implement the above method for positioning the movable device, and details thereof will be omitted here.

In an embodiment, an embodiment of the present disclosure further provides a computer readable storage medium having a computer program stored thereon. The program, when executed by a processor, implements the above method for positioning a movable device, and details thereof will be omitted here.

In an embodiment, an embodiment of the present disclosure further provides a computer device. The computer device includes a memory, a processor, and a computer program stored on the memory and executable on the processor. The processor is configured to, when executing the program, perform the above method for positioning a movable device, and details thereof will be omitted here.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage, CD-ROM, and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In the present disclosure, the principles and implementations of the present disclosure have been described with reference to specific embodiments. These embodiments are illustrative only, for facilitating understanding of the methods according to the present disclosure and core concepts thereof. Moreover, for those of ordinary skill in the art, modifications can be made to the specific implementations and application scenarios without departing from the principle of the present disclosure. In summary, the content of the specification should not be construed as limitation to the present disclosure.

What is claimed is:

1. A method for positioning a movable device moving in a tunnel with a bilaterally symmetrical cross section, the method comprising:
    obtaining point cloud data for a predetermined area at a top of the tunnel above the movable device;
    extracting, from the point cloud data, a first type of point cloud on a left side of the movable device and a second type of point cloud on a right side of the movable device, respectively, in accordance with a predetermined rule;
    matching the first type of point cloud on the left side of the movable device and the second type of point cloud on the right side of the movable device to obtain a transform matrix; and
    determining pose information of the movable device based on the transform matrix.

2. The method of claim 1, wherein the movable device is provided with a lidar having a scanning plane perpendicular to, or having an angle with, a movement plane of the movable device, and
    said obtaining the point cloud data for the predetermined area at the top of the tunnel above the movable device comprises:
        obtaining point cloud data of a predetermined area at the top of the tunnel above the movable device using the lidar.

3. The method of claim 1, wherein the predetermined area is an area having a predetermined distance from a reference point of the movable device.

4. The method of claim 1, wherein said extracting, from the point cloud data, the first type of point cloud on the left side of the movable device and the second type of point cloud on the right side of the movable device, respectively, in accordance with the predetermined rule comprises:
    obtaining reference point coordinates of a reference point of the movable device and point cloud coordinates of the point cloud data in a predetermined coordinate system; and
    dividing the point clouds into the first type of point cloud and the second type of point cloud based on the reference point coordinates and the point cloud coordinates.

5. The method of claim 1, wherein determining the pose information of the movable device based on the transform matrix comprises:
    determining a lateral position and a yaw of the movable device based on the transform matrix.

6. The method of claim 1, wherein said matching the first type of point cloud on the left side of the movable device and the second type of point cloud on the right side of the movable device to obtain the transform matrix comprises:
    obtaining a first number of point clouds of the first type and a second number of point clouds of the second type, and determining which type of point cloud has a larger number of point clouds and which type of point cloud has a smaller number of point clouds;
    preprocessing the point clouds with a smaller number of point clouds; and
    matching the preprocessed point clouds with the point clouds with the larger number of point clouds using a predetermined registration algorithm to obtain the transform matrix.

7. The method of claim 6, wherein said preprocessing the point clouds with a smaller number of point clouds comprises:
    forming the preprocessed point clouds by rotating the point clouds with the smaller number of point clouds around a Z-axis of a predetermined coordinate system by 180 degrees, wherein the predetermined coordinate system includes an X-axis, a Y-axis, and the Z-axis, where the X-axis is a lateral direction of the movable device, the Y-axis is a longitudinal direction of the movable device, and the Z-axis is perpendicular to a plane where the X-axis and the Y-axis are located,
    said matching the preprocessed point clouds with the point clouds with the larger number of point clouds using the predetermined registration algorithm to obtain the transform matrix comprises:
    matching the preprocessed point clouds with the point clouds with the larger number of point clouds using an Iterative Closest Point (ICP) algorithm or a Normal Distributions Transform (NDT) algorithm to obtain the transform matrix, the transform matrix including a translation vector t (C, m, n), where C is a displacement in the X-axis direction in the predetermined coordinate system when the point clouds are matched, m is a displacement in the Y-axis direction in the predetermined coordinate system when the point clouds are matched, and n is a displacement in the Z-axis direction in the predetermined coordinate system when the point clouds are matched.

8. The method of claim 5, wherein said determining the yaw of the movable device based on the transform matrix comprises:
    determining a first vertex of the tunnel from the point cloud data of the predetermined area at the top of the tunnel above the movable device based on a translation vector in the transform matrix;

selecting, from the point cloud data of the predetermined area at the top of the tunnel above the movable device, a target point cloud having Z-axis coordinates within a predetermined range from a Z-axis coordinate value of the first vertex based on coordinates of the first vertex of the tunnel in a predetermined coordinate system;

determining a straight line equation of a straight line based on the target point cloud, the straight line equation containing one or more parameters to be solved;

determining a cost function for all points in the target point cloud relative to the straight line;

solving the cost function, and determining one or more results of the one or more parameters to be solved when a cost value of the cost function is minimized; and determining the yaw of the movable device based on the one or more results of the one or more parameters to be solved.

9. A non-transitory computer readable storage medium having a computer program stored thereon, wherein the program, when executed by a processor, implements a method for positioning a movable device moving in a tunnel with a bilaterally symmetrical cross section, the method comprising:

obtaining point cloud data for a predetermined area at a top of the tunnel above the movable device;

extracting, from the point cloud data, a first type of point cloud on a left side of the movable device and a second type of point cloud on a right side of the movable device, respectively, in accordance with a predetermined rule;

matching the first type of point cloud on the left side of the movable device and the second type of point cloud on the right side of the movable device to obtain a transform matrix; and determining pose information of the movable device based on the transform matrix.

10. The non-transitory computer readable storage medium of claim 9, wherein the movable device is provided with a lidar having a scanning plane perpendicular to, or having an angle with, a movement plane of the movable device, and said obtaining the point cloud data for the predetermined area at the top of the tunnel above the movable device comprises:

obtaining point cloud data of a predetermined area at the top of the tunnel above the movable device using the lidar.

11. A computer device, comprising a memory, a processor, and a computer program stored on the memory and executable on the processor, wherein the processor is configured to, when executing the program, perform a method for positioning a movable device moving in a tunnel with a bilaterally symmetrical cross section, the method comprising:

obtaining point cloud data for a predetermined area at a top of the tunnel above the movable device;

extracting, from the point cloud data, a first type of point cloud on a left side of the movable device and a second type of point cloud on a right side of the movable device, respectively, in accordance with a predetermined rule;

matching the first type of point cloud on the left side of the movable device and the second type of point cloud on the right side of the movable device to obtain a transform matrix; and determining pose information of the movable device based on the transform matrix.

12. The computer device of claim 11, wherein the movable device is provided with a lidar having a scanning plane perpendicular to, or having an angle with, a movement plane of the movable device, and said obtaining the point cloud data for the predetermined area at the top of the tunnel above the movable device comprises:

obtaining point cloud data of a predetermined area at the top of the tunnel above the movable device using the lidar.

13. The computer device of claim 11, wherein the predetermined area is an area having a predetermined distance from a reference point of the movable device.

14. The computer device of claim 11, wherein said extracting, from the point cloud data, the first type of point cloud on the left side of the movable device and the second type of point cloud on the right side of the movable device, respectively, in accordance with the predetermined rule comprises:

obtaining reference point coordinates of the reference point of the movable device and point cloud coordinates of the point cloud data in a predetermined coordinate system; and dividing the point clouds into the first type of point cloud and the second type of point cloud based on the reference point coordinates and the point cloud coordinates.

15. The computer device of claim 12, wherein determining the pose information of the movable device based on the transform matrix comprises:

determining a lateral position and a yaw of the movable device based on the transform matrix.

16. The computer device of claim 12, wherein said matching the first type of point cloud on the left side of the movable device and the second type of point cloud on the right side of the movable device to obtain the transform matrix comprises:

obtaining a first number of point clouds of the first type and a second number of point clouds of the second type, and determining which type of point cloud has a larger number of point clouds;

preprocessing the point clouds with a smaller number of point clouds; and matching the preprocessed point clouds with the point clouds with the larger number of point clouds using a predetermined registration algorithm to obtain the transform matrix.

17. The computer device of claim 16, wherein said preprocessing the point clouds with a smaller number of point clouds comprises:

forming the preprocessed point clouds by rotating the point clouds with the smaller number of point clouds around a Z-axis of a predetermined coordinate system by 180 degrees, wherein the predetermined coordinate system includes an X-axis, a Y-axis, and the Z-axis, where the X-axis is a lateral direction of the movable device, the Y-axis is a longitudinal direction of the movable device, and the Z-axis is perpendicular to a plane where the X-axis and the Y-axis are located, said matching the preprocessed point clouds with the point clouds with the larger number of point clouds using the predetermined registration algorithm to obtain the transform matrix comprises:

matching the preprocessed point clouds with the point clouds with the larger number of point clouds using an Iterative Closest Point (ICP) algorithm or a Normal Distributions Transform (NDT) algorithm to obtain the transform matrix, the transform matrix including a translation vector t (C, m, n), where C is a displacement in the X-axis direction in the predetermined coordinate system when the point clouds are matched, m is a displacement in the Y-axis direction in the predetermined coordinate system when the point clouds are matched, and n is a displacement in the Z-axis direction in the predetermined coordinate system when the point clouds are matched.

18. The computer device of claim 15, wherein said determining the yaw of the movable device based on the transform matrix comprises:

determining a first vertex of the tunnel from the point cloud data of the predetermined area at the top of the tunnel above the movable device based on a translation vector in the transform matrix;

selecting, from the point cloud data of the predetermined area at the top of the tunnel above the movable device, a target point cloud having Z-axis coordinates within a predetermined range from a Z-axis coordinate value of the first vertex based on coordinates of the first vertex of the tunnel in a predetermined coordinate system;

determining a straight line equation of a straight line based on the target point cloud, the straight line equation containing one or more parameters to be solved;

determining a cost function for all points in the target point cloud relative to the straight line;

solving the cost function, and determining one or more results of the one or more parameters to be solved when a cost value of the cost function is minimized; and determining the yaw of the movable device based on the one or more results of the one or more parameters to be solved.

19. The method of claim 6, wherein the transform matrix comprises a translation vector, wherein determining the pose information of the movable device based on the transform matrix comprises:

determining a lateral position of the movable device based on the translation vector.

20. The non-transitory computer readable storage medium of claim 9, wherein said matching the first type of point cloud on the left side of the movable device and the second type of point cloud on the right side of the movable device to obtain the transform matrix comprises:

obtaining a first number of point clouds of the first type and a second number of point clouds of the second type, and determining which type of point cloud has a larger number of point clouds and which type of point cloud has a smaller number of point clouds;

preprocessing the point clouds with a smaller number of point clouds; and matching the preprocessed point clouds with the point clouds with the larger number of point clouds using a predetermined registration algorithm to obtain the transform matrix.

* * * * *